United States Patent [19]

Prew

[11] Patent Number: 5,667,157
[45] Date of Patent: Sep. 16, 1997

[54] BEARING CLEARANCE ADJUSTMENT

[75] Inventor: Stanley R. Prew, Wiliamsport, Pa.

[73] Assignee: Andritz Sprout-Bauer, Inc., Muncy, Pa.

[21] Appl. No.: 556,268

[22] Filed: Nov. 13, 1995

[51] Int. Cl.⁶ .................................................. B02C 25/00
[52] U.S. Cl. ............................ 241/27; 241/30; 241/33; 241/36
[58] Field of Search .............................. 241/27, 30, 33, 241/36, 213, 215, 275, 301

[56] References Cited

U.S. PATENT DOCUMENTS

| Re. 30,919 | 5/1982 | Sautter | 241/86.1 |
|---|---|---|---|
| 3,666,188 | 5/1972 | Lippmann | 241/213 |
| 3,720,288 | 3/1973 | Tschabold | 184/6.4 |
| 3,955,767 | 5/1976 | Hise | 241/275 |
| 4,139,244 | 2/1979 | Guerguerian | 241/36 X |
| 4,192,472 | 3/1980 | Johnson | 241/215 |
| 4,890,796 | 1/1990 | Reinhall | 241/30 |

*Primary Examiner*—John M. Husar
*Attorney, Agent, or Firm*—Chilton, Alix & Van Kirk

[57] ABSTRACT

The comminution apparatus comprises a drive shaft having a roller bearing which is disposed in a housing. A temperature detector mounted in the housing monitors the temperature of the roller bearing. Hydraulic fluid is supplied to a circumferential groove in the housing to apply hydraulic pressure to the outer raceway. The hydraulic fluid pressure is monitored by a pressure detector and gage and may be vented by a manually operated relief valve. The drive shaft is rotated at normal operating speed and normal load with the bearing clearance at maximum until the bearing reaches an equilibrium temperature. Raising the hydraulic pressure develops a force on the rear surface of the outer raceway, biasing the outer raceway towards the shaft and reducing the bearing clearance. Reducing the bearing clearance reduces waste heat generated by skidding between the rollers and the raceway. When the bearing clearance is reduced to the optimum clearance, the skidding is eliminated and the bearing temperature reaches a minimum value. Further reduction of the bearing clearance imposes a preload on the rollers, increasing the friction between the rollers and the raceways and generating waste heat. The pressure is lowered to the pressure that correlates with the minimum temperature.

18 Claims, 5 Drawing Sheets

BEARING CLEARANCE ADJUSTMENT

BACKGROUND OF THE INVENTION

This invention relates generally to a method and apparatus for setting the clearance for bearings. More particularly, the present invention relates to a method and apparatus for setting the clearance on roller bearings on comminution apparatus.

Ideally, there should be sufficient friction between the rollers and raceways to ensure that the rollers roll, not skid, as the shaft turns. In addition, contact should be maintained in and out of the load zone. The load zone is defined by the zone in which the rollers support the weight of the shaft. If there is too much contact, the bearing is preloaded and generates waste heat. If there is too little contact, the rollers roll in the load zone and skid when out of the load zone. Friction between the rollers and raceway during skidding generates waste heat. The rollers also tend to skew coming out of the load zone, causing undue cage wear.

There are several current methods of controlling internal bearing clearance. A first method utilizes a bearing with large internal clearances. The interference between the shaft and bearing bore is used to reduce the clearance to an acceptable level. The tolerance between the bearing and shaft must be compatible for this method to work.

A second method utilizes a tapered shaft sleeve to remove the excess clearance from the bearing. The bearing clearance is reduced by tightening a nut against the bearing, pushing it up the tapered sleeve until an arbitrary cold clearance value is achieved. The clearance is measured by inserting a feeler gage between the roller and raceway on the unloaded side. This method requires a good mechanic who utilizes trial and error.

Both of the above methods assume the chosen cold clearance is correct. In actuality, if a machine uses two identical roller bearings where the first is lightly loaded and the second is heavily loaded, the two bearings would require different internal clearances to operate properly.

SUMMARY OF THE INVENTION

Briefly stated, the invention in a preferred form is a method and apparatus for setting and regulating the total clearance between the bearings and the raceways on comminution apparatus.

The comminution apparatus comprises a roller bearing disposed around a drive shaft. Alternatively, spherical roller bearings or ball bearings may also be used with comminution apparatus. The rollers of the roller bearing engage an inner raceway mounted on the drive shaft and an outer raceway mounted on a housing. The housing is comprised of first and second shells which are mounted together by a plurality of bolts. A temperature detector is disposed in a blind bore in the first shell such that the temperature detector can monitor the temperature of the roller bearing. The first shell has three circumferential grooves on its inner surface. O-rings are disposed in the first and second grooves to fluidly seal the first shell to the inner raceway. The third groove is positioned intermediate the first and second grooves adjacent the inner raceway.

Hydraulic fluid is supplied to the third groove by a pump via an inlet port and a fluid passageway. The hydraulic fluid pressure is monitored by a pressure detector and gage. The hydraulic fluid may be vented by a manually operated relief valve.

The drive shaft is rotated at normal operating speed and preferably at normal load with the hydraulic fluid vented. In this condition the maximum bearing clearance is present, resulting in skidding between the raceways and the rollers that are out of the load zone. Such skidding causes friction which generates waste heat. The waste heat causes the temperature sensed at the temperature detector to rise until an equilibrium condition is reached where the waste heat addition is compensated by the heat loss from the comminution apparatus.

When the temperature sensed by the temperature detector stabilizes, the relief valve is closed and the pump is started to raise the hydraulic pressure. This pressure develops a force on the rear surface of the outer raceway, biasing the outer raceway towards the shaft and reducing the bearing clearance. As the bearing clearance is reduced from the maximum, the amount of skidding between the rollers and the raceway is reduced. Consequently, the amount of waste heat that is generated is reduced and the temperature sensed by the temperature detector goes down.

When the bearing clearance is reduced to the optimum clearance, the skidding is eliminated or at a minimal value. Therefore, the amount of waste heat that is generated is minimized and the temperature sensed by the temperature detector reaches a minimum value. Further reduction of the bearing clearance imposes a preload on the rollers, increasing the friction between the rollers and the raceways. Such friction generates waste heat which is detected by the temperature detector as an increase in temperature. The pump is shut off and the pressure is lowered to the pressure that correlated with the minimum sensed temperature.

It is an object of the invention to provide a new and improved method and apparatus for optimizing the bearing clearance on a comminution apparatus.

It is another object of the invention to provide a new and improved method and apparatus for optimizing the bearing clearance on a comminution apparatus at operating conditions.

It is a further object of the invention to provide a new and improved method and apparatus for measuring and reducing the friction in a bearing on a comminution apparatus.

Other objects and advantages of the invention will become apparent from the drawings and specification.

BRIEF DESCRIPTION OF THE DRAWINGS

The present invention may be better understood and its numerous objects and advantages will become apparent to those skilled in the art by reference to the accompanying drawings in which.

DETAILED DESCRIPTION OF THE PREFERRED EMBODIMENT

Figure 1:
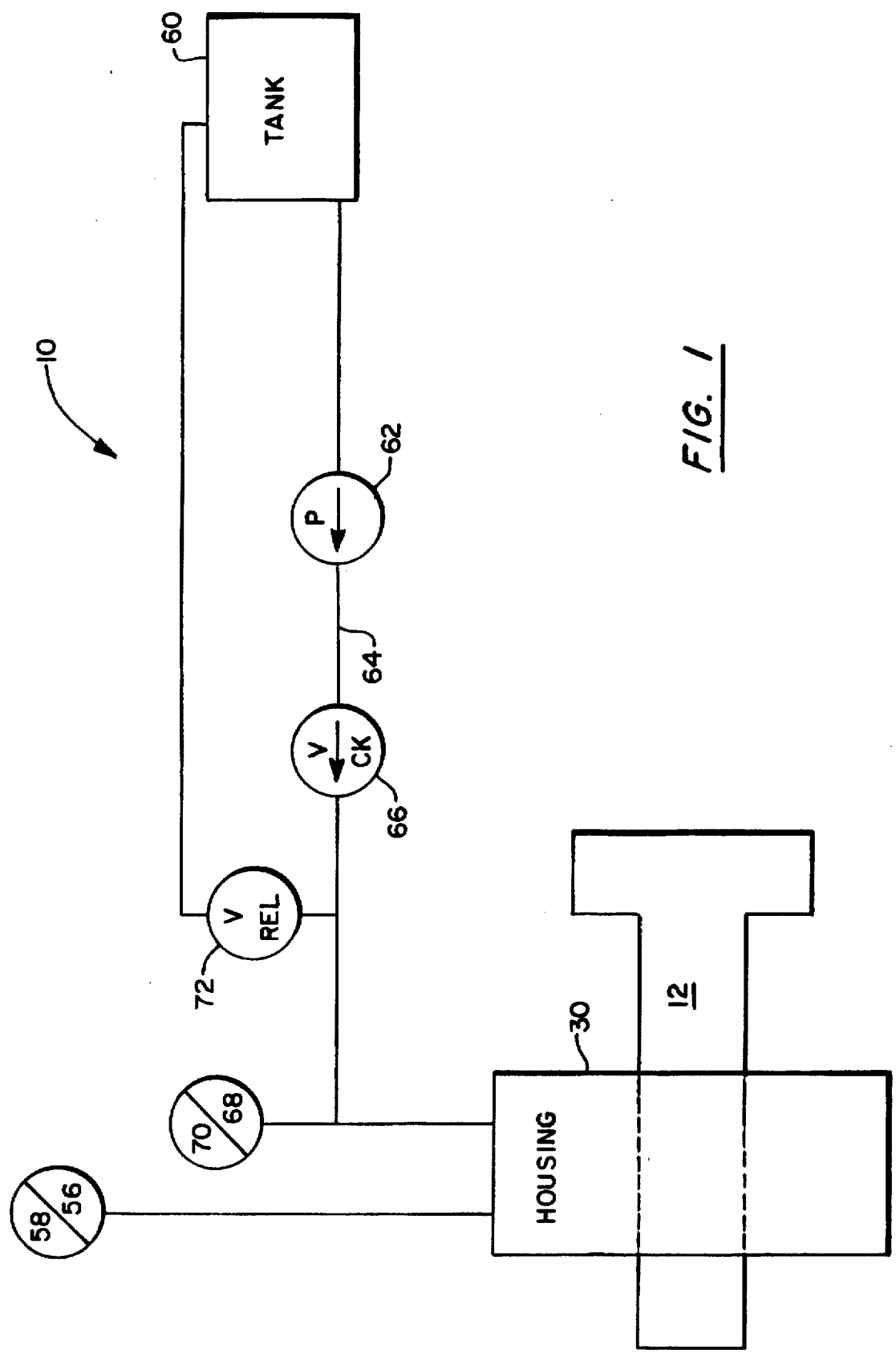
FIG. 1 is a schematic view of a comminution apparatus in accordance with the present invention.
Figure 2:
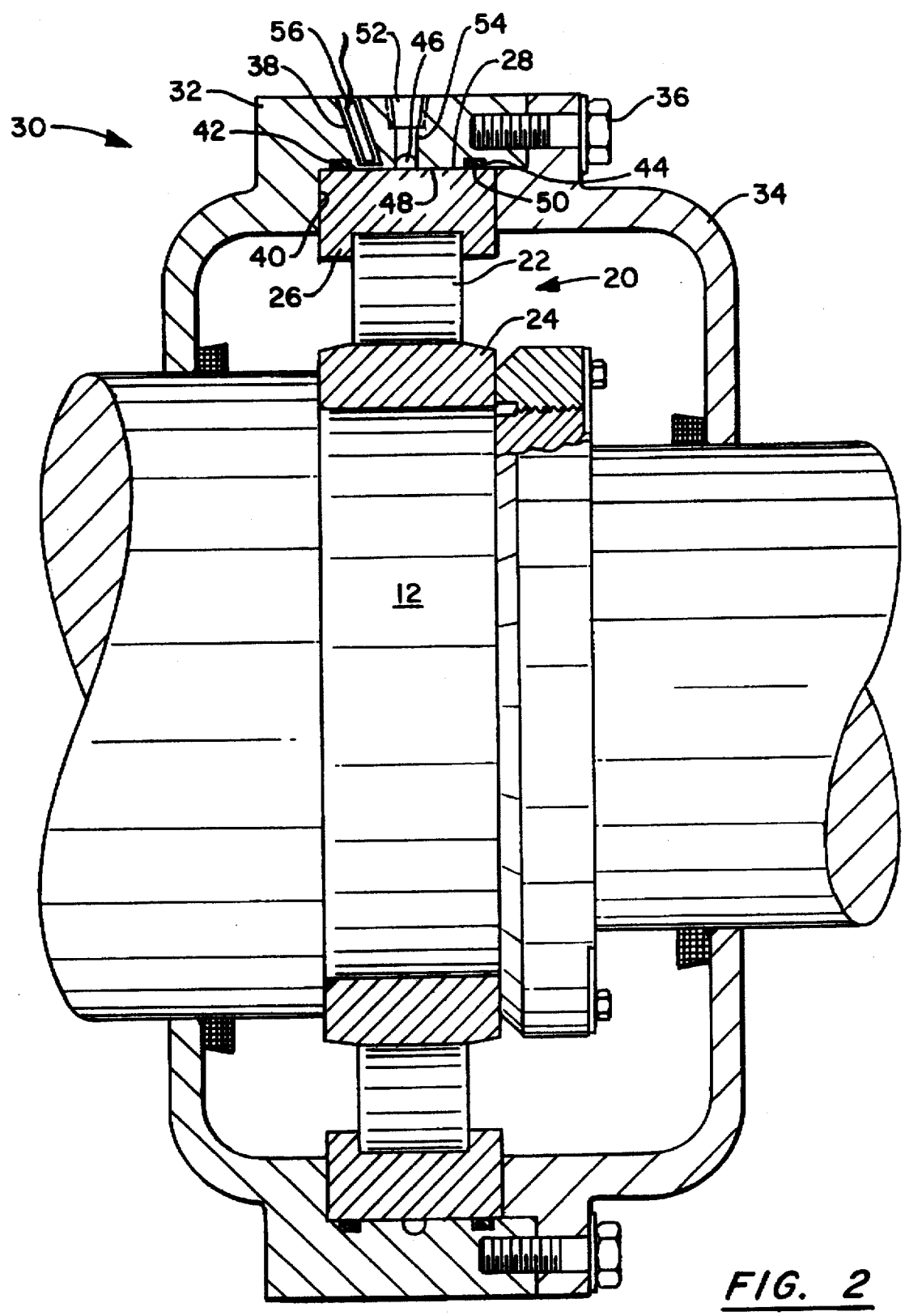
FIG. 2 is a cross-section view, partly broken away, of a first embodiment of the roller bearing, drive shaft, housing and temperature detector of a comminution apparatus in accordance with FIG. 1.
Figure 5:
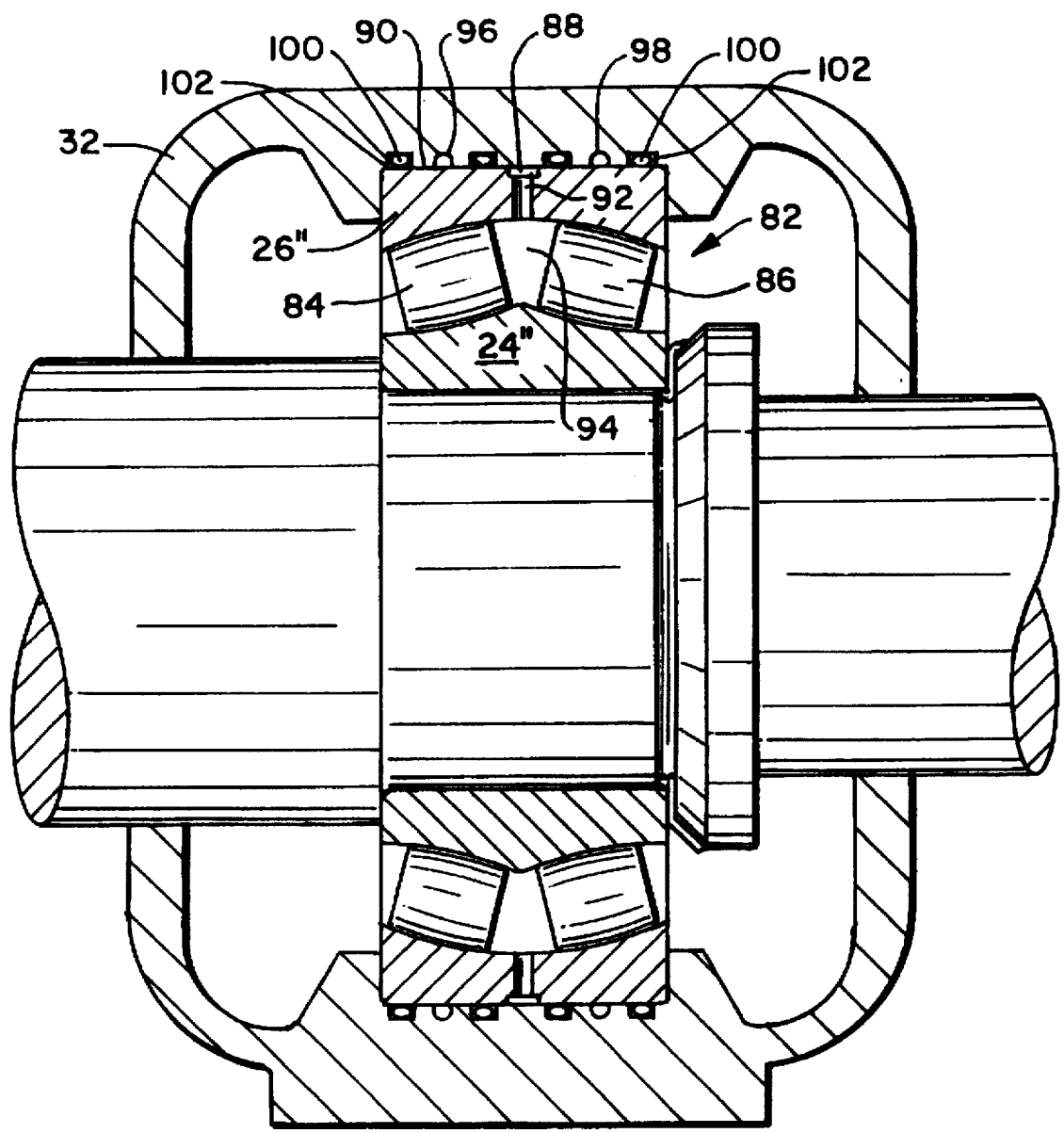
FIG. 5 is a cross-section view, partly broken away, of a fourth embodiment of the roller bearing, drive shaft, and housing of a comminution apparatus in accordance with FIG. 1.

With reference to the drawings wherein like numerals represent like parts throughout the several figures, comminution apparatus in accordance with the present invention is generally designated by the numeral 10 (FIG. 1). The comminution apparatus comprises a bearing 20 disposed around a drive shaft 12 (FIGS. 1 and 2). The rollers 22 of the roller bearing 20 engage an annular inner raceway 24 mounted for rotation with the drive shaft 12 and an annular outer raceway 26 fixedly mounted on a stationary housing. Alternatively, spherical roller bearings (FIG. 5) or ball bearings may also be used with comminution apparatus 10.

The housing 30 is comprised of first and second shells 32, 34 which are mounted together by a plurality of bolts 36. A temperature detector 56, for example a thermocouple, is disposed in a blind bore 38 in the first shell 32. The bore 38 is positioned such that the temperature detector 56 can monitor the temperature of the roller bearing 20. Alternatively, the temperature detector 56 may be mounted in a blind bore in the second shell 34 or interior to the housing 30. The outer raceway 26 is disposed in an inner circumferential channel 40 defined by the first and second shells 32, 34. In a preferred embodiment, the first shell 32 has three circumferential grooves 42, 44, 46 on its inner surface 48. O-rings 50 are disposed in the first and second grooves 42, 44 to fluidly seal the first shell 32 to the outer raceway 26. The third groove 46 is positioned intermediate the first and second grooves 42, 44. An inlet port 52 and passageway 54 in the first shell 32 provide fluid communication to the third groove 46. In an alternative embodiment, third groove 46' may be positioned intermediate first and second grooves 42', 44' on the shaft, FIG. 3. An inlet port and passageway (not shown) in the shaft 12 provide fluid communication to the third groove 46'.

As shown in FIG. 1, hydraulic fluid is supplied from a hydraulic fluid storage tank 60 to the inlet port 52 by a pump 62 via a fluid supply line 64. A check valve 66 in the supply line 64 prevents inadvertent back-flow to the storage tank 60. A pressure detector 68 monitors the pressure in the supply line 64 and sends a pressure signal to a pressure gage 70. A manually operated relief valve 72 allows the hydraulic pressure in the supply line 64 to be vented back to the storage tank 60.

A test is utilized to determine the optimum bearing clearance for roller bearing 20. The drive shaft 12 is rotated at normal operating speed and preferably at normal load with the supply line 64 vented to the storage tank 60 so raceways 24, 26 are farthest apart. In this condition the maximum bearing clearance is present, resulting in skidding between the raceways 24, 26 and the rollers 22 that are out of the load zone. Such skidding causes friction which generates waste heat. The waste heat will cause the temperature sensed at the temperature detector 56 to rise until an equilibrium condition is reached where the waste heat addition is compensated by the heat loss from the comminution apparatus 10.

When the temperature sensed by the temperature detector 56 stabilizes, as indicated at temperature gage 58, the relief valve 72 is closed and the pump 62 is started to raise the hydraulic pressure in the supply line 64. This pressure is communicated to the third groove 46 via the port 52 and passageway 54 and develops a force on the rear surface 28 of the outer raceway 26. The hydraulic force moves the outer raceway 26 towards the rollers 22 and the inner raceway 24 on shaft 12, reducing the bearing clearance. As the bearing clearance is reduced from the maximum, the amount of skidding between the rollers 22 and the raceways 24, 26 is reduced. Consequently, the amount of waste heat that is generated is reduced and the temperature sensed by the temperature detector 56 goes down. It should be appreciated that the rate of pressure increase is regulated to allow correlation between the pressure and the temperature.

When the bearing clearance is reduced to the optimum clearance, the skidding is eliminated or at a minimal value. Therefore, the amount of waste heat that is generated is minimized and the temperature sensed by the temperature detector 56 reaches a minimum value. Further reduction of the bearing clearance imposes a preload on the rollers 22, increasing the friction between the rollers 22 and the raceways 24, 26. Such friction generates waste heat which is detected by the temperature detector 56 as an increase in temperature. Consequently, during the test the pressure is allowed to increase until the sensed temperature reaches a minimum value and then begins to increase. The pump 62 is shut off and the supply line pressure is lowered to the pressure that correlated with the minimum sensed temperature.

In another embodiment (FIG. 4), a tapered sleeve 80 is utilized to initially adjust the bearing clearance at cold conditions, as described in the Background of the Invention. Final adjustment of the bearing clearance at operating temperature and speed is accomplished in a manner similar to that of the first embodiment.

Figure 3:
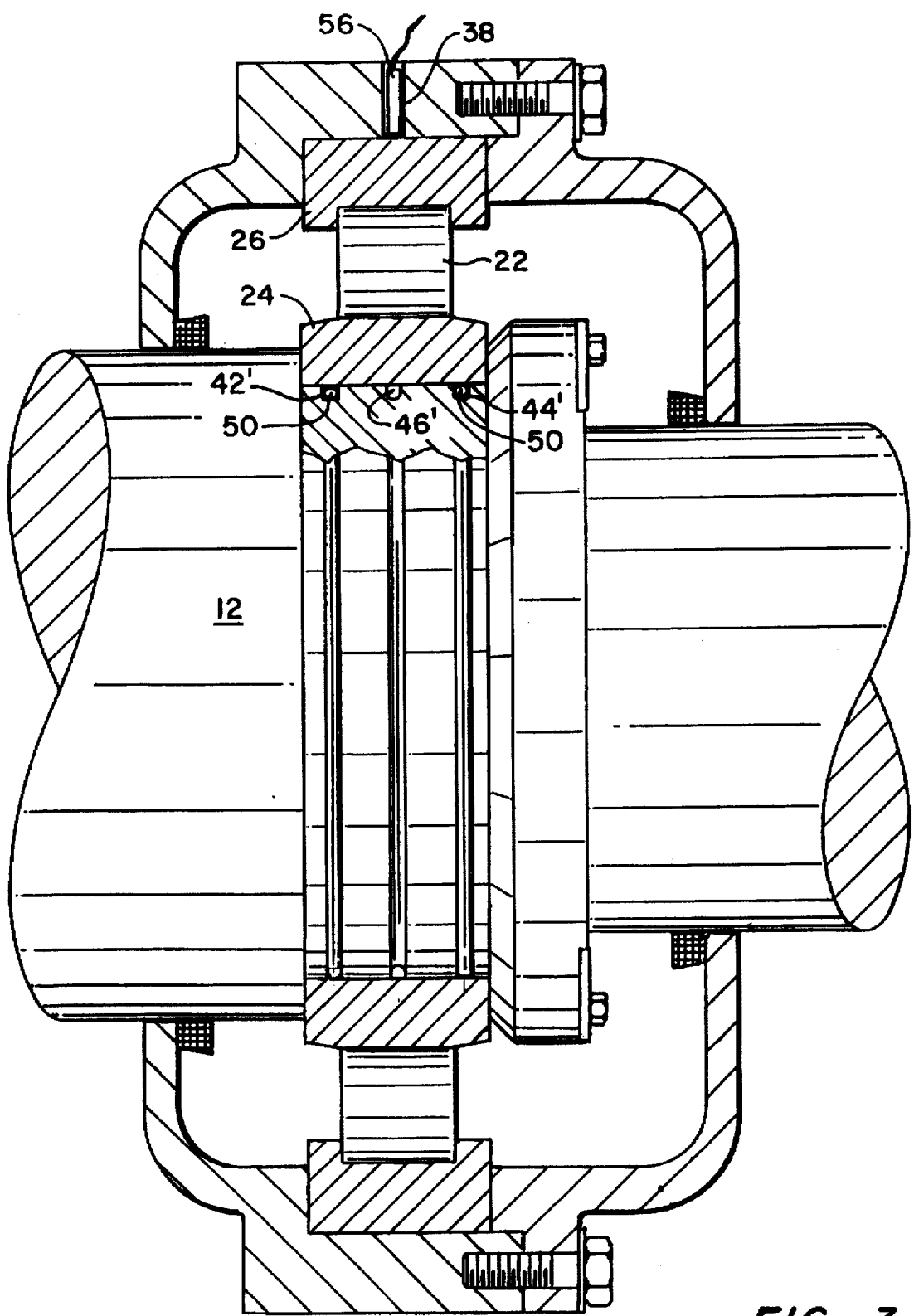
FIG. 3 is a cross-section view, partly broken away, of a second embodiment of the roller bearing, drive shaft, housing and temperature detector of a comminution apparatus in accordance with FIG. 1.
Figure 4:
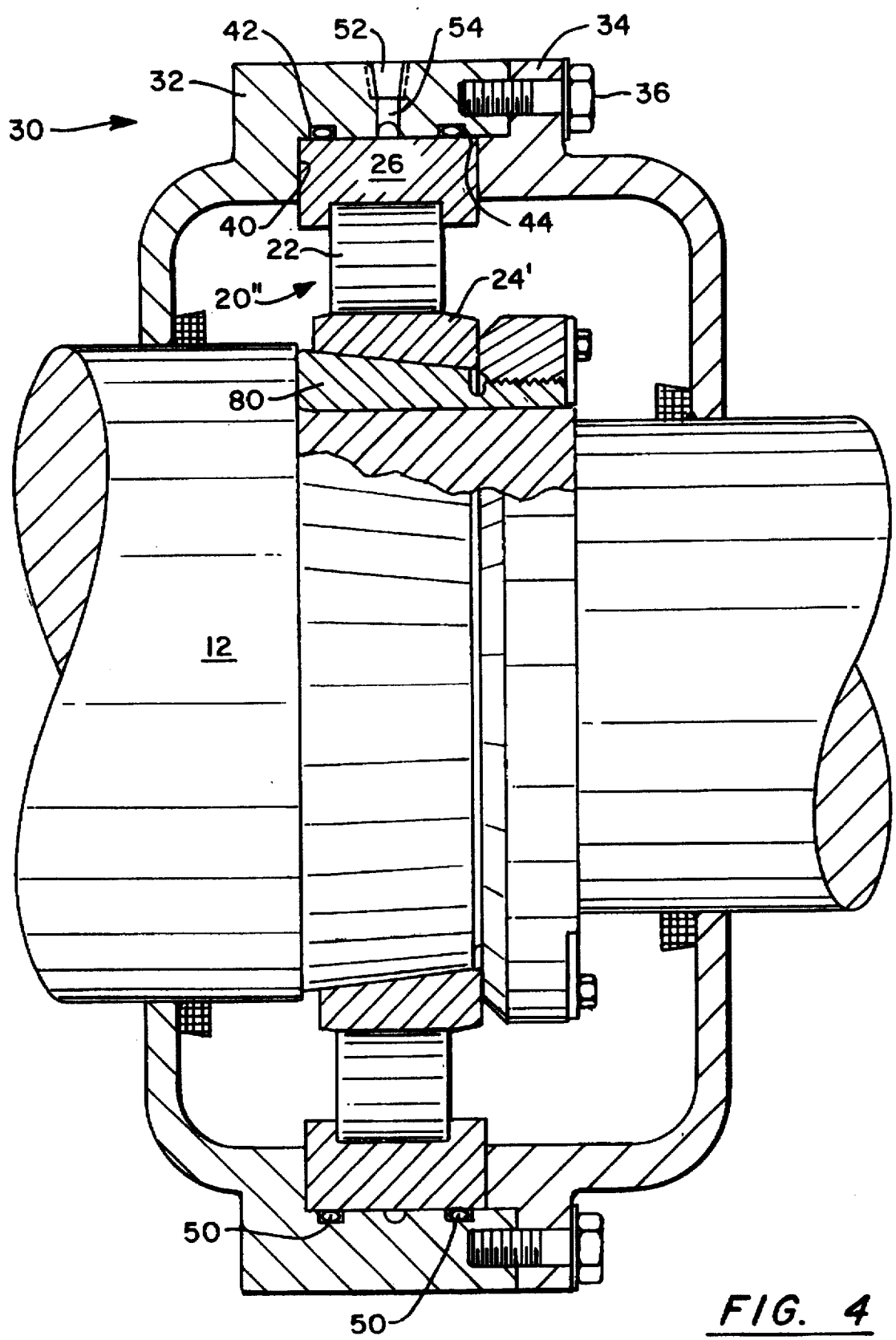
FIG. 4 is a cross-section view, partly broken away, of a third embodiment of the roller bearing, drive shaft, housing and temperature detector of a comminution apparatus in accordance with FIG. 1.

In another embodiment (FIG. 5), a two-row spherical roller bearing 82 is used in place of the roller bearing 20 of FIGS. 2–4. Such bearings typically comprise two adjacent rows of rollers 84, 86. The outer raceway 26" has a circumferential lubrication distribution groove 88 on the outer surface 90 and a plurality of passageways 92 providing fluid communication between the lubrication distribution groove 88 and the space 94 between the inner and outer raceways 24", 26". A lubricating fluid is supplied from a sump (not shown) to the lubricate the two rows of rollers 84, 86 via the lubrication distribution groove 88 and the passageways 92. Consequently, the method of sealing the hydraulic fluid shown in FIG. 2 may not be used for this embodiment. Complimentary hydraulic distribution grooves 96, 98 are positioned on either side of the lubrication distribution groove 88 to evenly distribute the hydraulic force on the outer raceway 26". O-rings 100 disposed in grooves 102 positioned on either side of each hydraulic distribution groove 96, 98 fluidly seal the first shell 32 to the outer raceway 26".

It should be appreciated that mechanical or electrical means rather than hydraulic pressure may be utilized for regulating the bearing clearance.

While preferred embodiments have been shown and described, various modifications and substitutions may be made thereto without departing from the spirit and scope of the invention. Accordingly, it is to be understood that the present invention has been described by way of illustration and not limitation.

What is claimed is:
1. Comminution apparatus comprising:
   a drive shaft, said drive shaft being rotatable about an axis for comminuting material;
   housing means disposed around at least a portion of said drive shaft;
   roller bearing means comprising first and second raceways and a plurality of rollers disposed intermediate said first and second raceways, wherein said first race- way and said rollers define a first clearance and said second raceway and said rollers define a second clearance, said first and second clearances defining a total clearance, said bearing means being disposed around said drive shaft and within said housing wherein said first raceway is adjacent a surface of said housing and said second raceway is adjacent said drive shaft;

temperature monitoring means for monitoring a temperature adjacent said bearing means, said temperature being commensurate with heat generated by friction between said raceways and said rollers; and adjustment means for radially moving one of said raceways whereby moving said raceway towards said rollers reduces said total clearance, said adjustment means being actuatable while said drive shaft is rotating;

wherein said total clearance is set at a maximum total clearance while said drive shaft is stationary, said drive shaft is rotated at a normal speed of rotation until said temperature stabilizes at a maximum temperature, said adjustment means is actuated to move said raceway towards said rollers until said temperature reaches a minimum temperature whereby said friction is minimized.

2. The comminution apparatus of claim 1 wherein said apparatus further comprises first and second seal means for fluidically sealing said surface of said housing with said first raceway.

3. The comminution apparatus of claim 2 wherein said surface of said housing comprises a circumferential groove disposed intermediate said first and second seal means.

4. The comminution apparatus of claim 3 wherein said housing further comprises a port and a fluid passageway for providing fluid communication with said groove.

5. The comminution apparatus of claim 4 wherein said adjustment means comprises pump means in fluid communication with said port for providing hydraulic fluid pressure to said groove, wherein actuating said pump means raises said fluid pressure in said groove whereby said fluid pressure generates a force on said first raceway to move said first raceway radially towards said rollers.

6. The comminution apparatus of claim 5 further comprising pressure monitoring means in fluid communication with said groove.

7. The comminution apparatus of claim 5 further comprising hydraulic fluid storage means and valve means in fluid communication with said groove wherein opening said valve means allows said hydraulic pressure to vent to said storage means whereby said hydraulic pressure is reduced.

8. The comminution apparatus of claim 1 wherein said temperature monitoring means comprises a temperature sensor and a temperature gage.

9. The comminution apparatus of claim 8 wherein said housing comprises a blind bore, said temperature sensor being mounted in said blind bore.

10. The comminution apparatus of claim 1 wherein shaft has a surface and said apparatus further comprises first and second seal means for fluidically sealing said surface of said shaft with said second raceway.

11. The comminution apparatus of claim 10 wherein surface of said shaft comprises a circumferential groove disposed intermediate said first and second seal means.

12. The comminution apparatus of claim 11 wherein said adjustment means comprises pump means in fluid communication with said groove for providing hydraulic fluid pressure to said groove, wherein actuating said pump means raises said fluid pressure in said groove whereby said fluid pressure generates a force on said second raceway to move said second raceway radially towards said rollers.

13. The comminution apparatus of claim 1 wherein said roller bearing means comprises a spherical roller bearing comprising first and second rows of rollers and a plurality of lubrication ports providing fluid communication intermediate said first and second rows, and wherein said apparatus further comprises first and second seal means disposed on a first side of said ports and third and fourth seal means disposed on a second side of said ports for fluidically sealing said surface of said housing with said first raceway.

14. The comminution apparatus of claim 13 wherein said surface of said housing comprises a first circumferential groove disposed intermediate said first and second seal means and a second circumferential groove disposed intermediate said third and fourth seal means.

15. The comminution apparatus of claim 1 wherein movement of said raceway is regulated.

16. A method for setting bearing clearance on a comminution apparatus having a housing, at least one bearing for rotatably mounting a shaft, and means for monitoring temperature adjacent said bearing, the method comprising the steps of:

A) monitoring the temperature while the shaft is rotating;
B) adjusting the clearance of the bearing; and
C) setting the clearance of the bearing at a position corresponding to a minimum temperature.

17. A method for optimizing total bearing clearance on a comminution apparatus having a drive shaft which is rotatable about an axis for comminuting material, a housing disposed around at least a portion of said drive shaft, and at least one roller bearing comprising first and second raceways and a plurality of rollers disposed intermediate said first and second raceways, wherein said first raceway and said rollers define a first clearance and said second raceway and said rollers define a second clearance, said first and second clearances defining a total bearing clearance, said bearing means being disposed around said drive shaft and within said housing wherein said first raceway is adjacent a surface of said housing and said second raceway is adjacent said drive shaft, the comminution apparatus further having a temperature monitor for monitoring a temperature adjacent said bearing, said temperature being commensurate with friction between said raceways and said rollers, and means for radially adjusting one of said raceways, said adjustment means being actuatable while said drive shaft is rotating, the method comprising the steps of:

A) setting said total bearing clearance at a maximum while said drive shaft is stationary;
B) rotating said drive shaft at a normal speed of rotation until said temperature stabilizes at a maximum temperature;
C) actuating said mover means to radially move a said raceway to a position closer to said rollers;
D) monitoring a decrease in said temperature as said mover means moves said raceway;
E) repeating steps C) and D) until said temperature stops decreasing and starts to increase thereby establishing a minimum temperature; and
F) actuating said mover means to radially move said raceway to a position correlating to said minimum temperature.

18. A method for optimizing total bearing clearance on a comminution apparatus having a drive shaft which is rotatable about an axis for comminuting material, a housing disposed around at least a portion of said drive shaft and at least one bearing comprising first and second raceways and a plurality of bearings disposed intermediate said first and second raceways, wherein said first raceway and said bearings define a first clearance and said second raceway and said bearings define a second clearance, said first and second clearances defining a total bearing clearance, said bearing means being disposed around said drive shaft and within said housing wherein said first raceway is adjacent a surface of said housing and said second raceway is adjacent said drive shaft, the comminution apparatus further having a temperature monitor for monitoring a temperature adjacent said bearing means, said temperature being commensurate with friction between said raceways and said bearings, a hydraulic pump for applying hydraulic pressure between said housing and said first raceway, a relief valve for venting said hydraulic pressure, and a pressure monitor for monitoring said hydraulic pressure, wherein said hydraulic pressure develops a hydraulic force which radially moves said first raceway, said pump being actuatable while said drive shaft is rotating, the method comprising the steps of:

A) setting said total bearing clearance at a maximum while said drive shaft is stationary;

B) rotating said drive shaft at a normal speed of rotation until said temperature stabilizes at a maximum temperature;

C) actuating said pump to radially move said first raceway to a position closer to said bearings;

D) monitoring a decreasing temperature and an increasing pressure as said first raceway is moved;

E) repeating steps C) and D) until said temperature stops decreasing and starts to increase;

F) stopping said pump; and

G) venting said hydraulic pressure to a value which correlates with a minimum temperature.

\* \* \* \* \*